(12) United States Patent
Kim

(10) Patent No.: US 7,480,960 B2
(45) Date of Patent: Jan. 27, 2009

(54) BUMPER DEVICE OF ROBOT CLEANER AND ROBOT CLEANER HAVING THE SAME

(75) Inventor: Young-Gie Kim, Kuri (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 11/382,745

(22) Filed: May 11, 2006

(65) Prior Publication Data

US 2006/0260090 A1    Nov. 23, 2006

(30) Foreign Application Priority Data

May 17, 2005    (KR)    ............ 10-2005-0041336

(51) Int. Cl.
*A47L 9/00* (2006.01)
(52) U.S. Cl. .................. 15/325; 15/319; 15/340.1; 15/339
(58) Field of Classification Search .......... 15/325, 15/340.1, 319, 339
See application file for complete search history.

(56) References Cited

U.S. PATENT DOCUMENTS

| | | | | |
|---|---|---|---|---|
| 2,698,955 | A * | 1/1955 | Trindl | 15/244.1 |
| 4,831,682 | A * | 5/1989 | White | 15/246.2 |
| 4,968,878 | A * | 11/1990 | Pong et al. | 250/221 |
| 5,376,785 | A * | 12/1994 | Chin et al. | 250/214 PR |
| 7,137,472 | B2 * | 11/2006 | Aoki | 180/274 |
| 2004/0187249 | A1 * | 9/2004 | Jones et al. | 15/319 |
| 2005/0000543 | A1 * | 1/2005 | Taylor et al. | 134/18 |
| 2005/0021181 | A1 * | 1/2005 | Kim et al. | 700/245 |
| 2005/0217061 | A1 * | 10/2005 | Reindle | 15/319 |
| 2007/0032904 | A1 * | 2/2007 | Kawagoe et al. | 700/245 |
| 2007/0142964 | A1 * | 6/2007 | Abramson | 700/245 |

FOREIGN PATENT DOCUMENTS

| | | |
|---|---|---|
| CN | 1600228 | 3/2005 |
| JP | 2 241421 | 9/1990 |
| JP | 2002-360479 | 12/2002 |

OTHER PUBLICATIONS

English language Abstract of JP 2-2421421.
English Language Abstract of JP 2002-360479.
English language Abstract of CN 1600228.

* cited by examiner

*Primary Examiner*—Joseph J. Hail, III
*Assistant Examiner*—Robert Scruggs
(74) *Attorney, Agent, or Firm*—Greenblum & Bernstein, P.L.C.

(57) ABSTRACT

A bumper device of a robot cleaner, and a robot cleaner equipped with the bumper device are disclosed. The bumper device of a robot cleaner includes: a bumper housing coupled to cover an outer circumferential surface of a main body of a robot cleaner, made of a material for restraining an expansion, and having an internal passage; an air tube insertedly installed inside the bumper housing so as to be expandable along the internal passage; and a sensing unit for sensing expansion of the air tube. Even if an impact is applied to any position of front, side and rear surfaces of the main body, it can be lessened in its transfer to the robot cleaner.

4 Claims, 8 Drawing Sheets

BUMPER DEVICE OF ROBOT CLEANER AND ROBOT CLEANER HAVING THE SAME

BACKGROUND OF THE INVENTION

1. Field of the Invention

The present invention relates to a bumper device of a robot cleaner and a robot cleaner having the same and, more particularly, to a bumper device of a robot cleaner capable of buffering an impact applied to any portion of an outer surface of a main body of a robot cleaner, and stopping an operation or changing a running direction by sensing the generation of the impact, and a robot cleaner having the same.

2. Description of the Related Art

In general, a robot cleaner is a device that senses a cleaning region and an obstacle by using a sensor according to a command of a controller and automatically performs cleaning by traveling in the cleaning region. When power of a battery provided in the device is used up, the device moves to a charging stand installed at a certain position for its charging, and when charging is completed, the device resumes cleaning.

Usually, the robot cleaner senses existence of an obstacle in the cleaning area before traveling and performs cleaning, but it may collide with an obstacle that has not been previously sensed during its traveling according to circumstances.

When the robot cleaner collies with the obstacle, a bumper installed at a front side of a main body of the robot cleaner buffers it, and at the same time, a controller senses it and controls the robot cleaner to run by evading the obstacle.

A related art robot cleaner having the buffer device will now be described with reference to the accompanying drawings.

FIG. 1 is a perspective view of a robot cleaner having a bumper device according to a related art, FIG. 2 is a sectional view taken along line A-A of the bumper device in FIG. 1 without having an impact applied thereto, and FIG. 3 is a sectional view taken along line A-A of the bumper device to which an impact has been applied.

With reference to FIG. 1, the related art robot cleaner 1 having the bumper device 30 includes a robot cleaner main body 10 having a suction opening (not shown) for sucking dust or debris from a floor of a room or the like, a driving wheel 20 installed at a lower portion of the main body 10 and enabling the robot cleaner to travel around, and a bumper device 30 coupled at a front side of the main body is 10 and buffering an impact applied to the main body 10 when the robot cleaner collides with an obstacle.

With reference to FIG. 2, the robot cleaner main body 10 includes projection parts 11 protruded from outer side of the main body 10 to allow the bumper device 30 to be mounted, and fixing protrusions 11a formed at an end portion of the projection parts 11 to fix the bumper unit 30 so that it cannot be released.

The bumper device 20 includes a bumper case 31 for forming the exterior, hooking portions 31a caught by the fixing protrusions 11a of the projection parts 11 of the main body 10, a micro-switch 32 having a contact terminal 32a protruded to outward direction of the main body 10 and sensing a collision, and a contact protrusion 33 formed at an inner side of the bumper case 31 and contacting with the contact terminal 32a of the micro-switch 32 in occurrence of a collision with an obstacle.

The bumper device 30 additionally includes a pair of springs 34 coupled between an inner surface of the bumper case 31 and an outer surface of the main body 10 to buffer an external impact, and returning the bumper case 31 to its original state when the impact dissolves, and a coupling part 34a for coupling the springs 34 between the inner surface of the bumper case 31 and the outer surface of the main body 10.

The operation of the related robot cleaner 1 having the bumper device 30 will now be described.

With reference to FIG. 1, when the robot cleaner is turned on, it travels in a cleaning region according to rotation of the driving wheel 20, sucking dust or debris from the floor by a suction force of a fan motor (not shown) so as to be collected into a filter (not shown).

With reference to FIGS. 2 and 3, when the robot cleaner collides with an obstacle 80, a corresponding impact applied to the bumper device 30 is buffered by the springs 34 installed between the bumper case 31 and the main body 10 of the robot cleaner, to thus prevent transferring of the impact to an internal component of he main body of the robot cleaner.

At the same time, the bumper case 31 is slidably pushed toward the main body 10 of the robot cleaner, making the contact protrusion 33 formed at the inner side of the bumper case 31 contact with the contact terminal 32a of the micro-switch 32.

Then, the micro-switch 32 transmits a signal to a controller (not shown), and the controller allow the robot cleaner to perform cleaning by avoiding the obstacle 80.

However, the related art bumper device 30 has the problem that the buffering and collision sensing can be performed only when an impact is applied to the front side of the main body 10 of the robot cleaner. In addition, its construction is so complicate that a volume and weight of the main body 10 increase and its cost is also increased.

As one method for solving the problems, installation of several micro-switches along a circumferential surface of the main body 10 of the robot cleaner can be considered, but problems arise that a cost incurs for installing several micro-switches to increase the expense and a wiring structure for connecting the several micro-switches becomes complicate.

SUMMARY OF THE INVENTION

One aspect of the present invention involves the recognition by the present inventors of the drawbacks in the related art as explained above Therefore, one feature of the present invention is to provide a bumper device of a robot cleaner capable of sensing and buffering an impact applied from any position of front, side and rear surfaces of a main body of the robot cleaner, and sensing a collision.

Another feature of the present invention is to provide a bumper device of a robot cleaner capable of preventing a waste of a space and a cost by reducing volume and weight.

Still another feature of the present invention is to provide a robot cleaner having the bumper device with features described above.

To implement at least the above features in whole or in parts, the present invention provides a bumper device of a robot cleaner including: a bumper housing coupled to cover an outer circumferential surface of a main body of a robot cleaner, made of a material for restraining an expansion, and having an internal passage; an air tube insertedly installed in the bumper housing so as to be expandable along the internal passage; and a sensing unit for sensing expansion of the air tube.

With this structure, an impact applied to any position of the outer circumferential surface of the main body of the robot cleaner can be sensed. Herein, the sensing unit includes a light emitting unit for emitting light and a light receiving unit for receiving light emitted from the light emitting unit. Preferably, an operational piece moved for making interference between the light emitting unit and the light receiving unit by interworking with expansion of the air tube is attached at one end of the air tube.

To implement at least the above features in whole or in parts, the present invention also provides a robot cleaner including: a main body; a driving wheel installed at a lower portion of the main body and enabling the robot cleaner to travel; and a bumper device coupled to cover an outer circumferential surface of the main body of the robot cleaner and buffering an impact.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A robot cleaner having a bumper device according to the present invention will be described with reference to the accompanying drawings.

Figure 1:
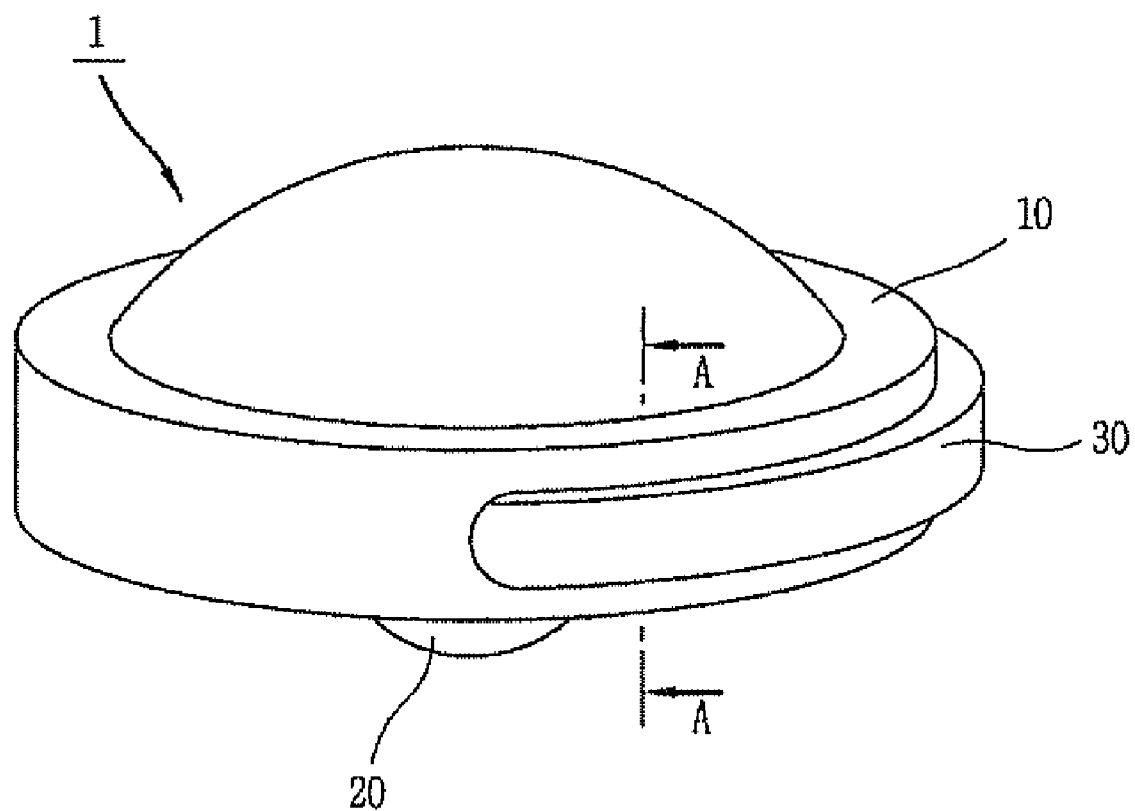
FIG. 1 is a perspective view of a robot cleaner having a bumper device according to a related art.
Figure 2:
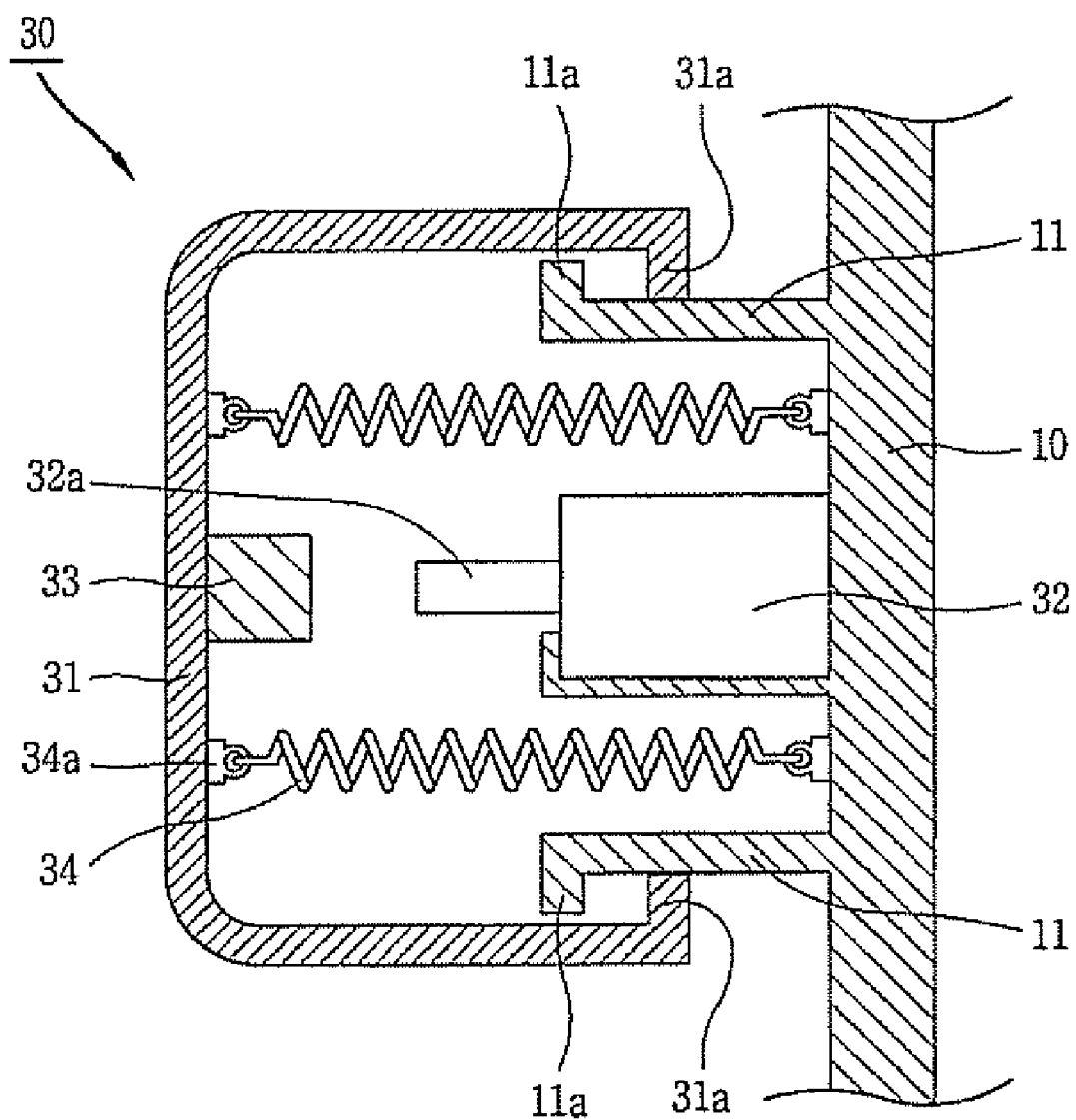
FIG. 2 is a sectional view taken along line A-A of the bumper device in FIG. 1 without having an impact applied thereto.
Figure 3:
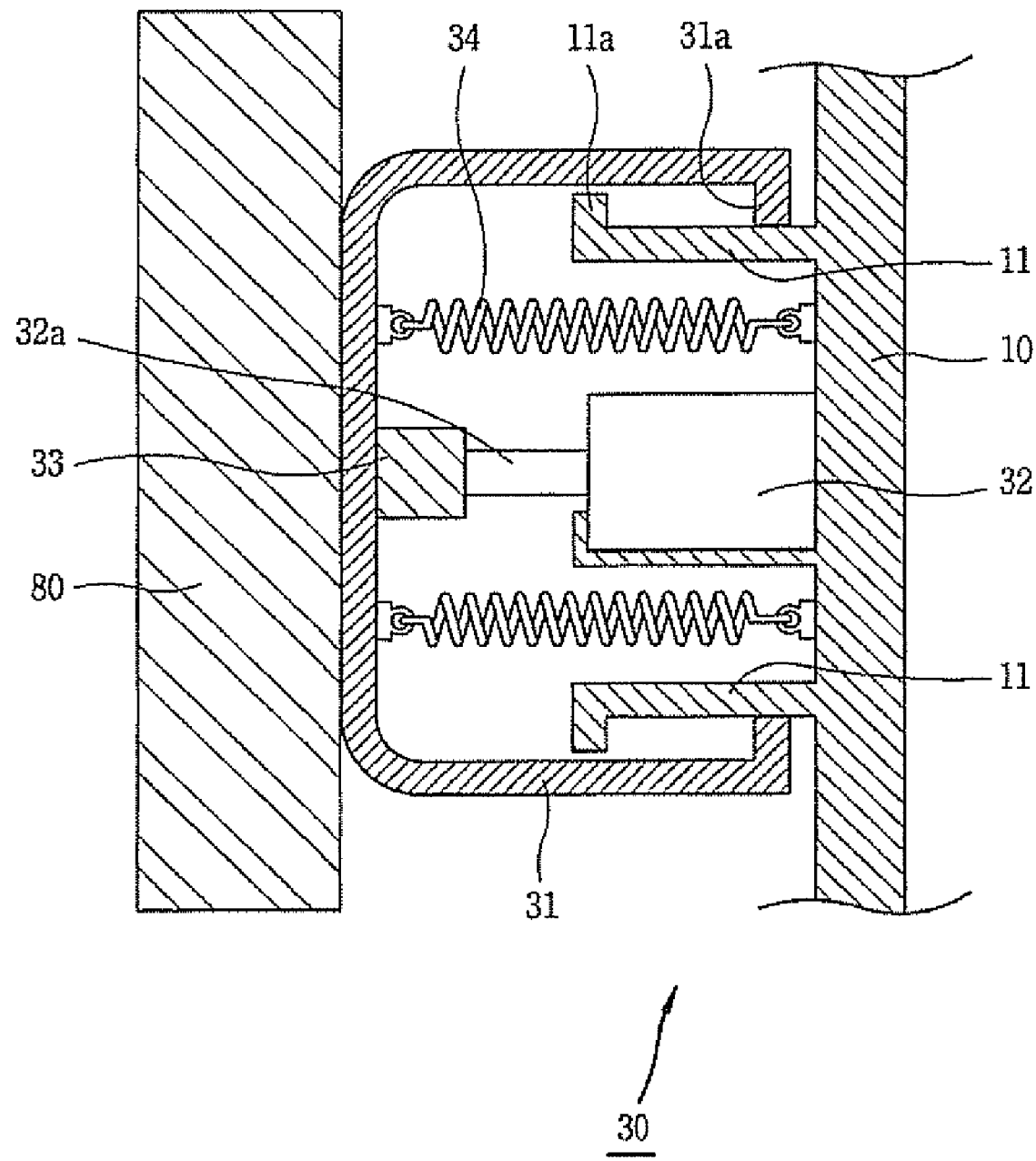
FIG. 3 is a sectional view taken along line A-A of the bumper device in FIG. 1 to which an impact has been applied.
Figure 4:
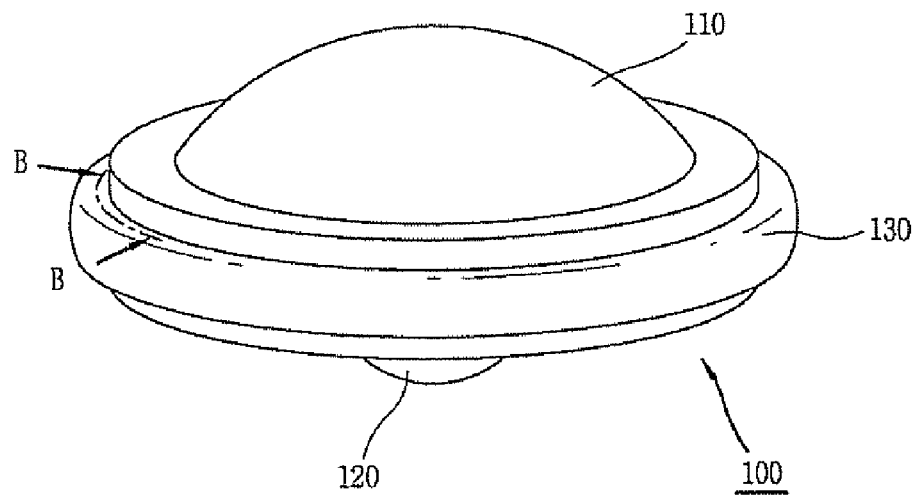
FIG. 4 is a perspective view of a robot cleaner having a bumper device according to an exemplary embodiment of the present invention.
Figure 5:
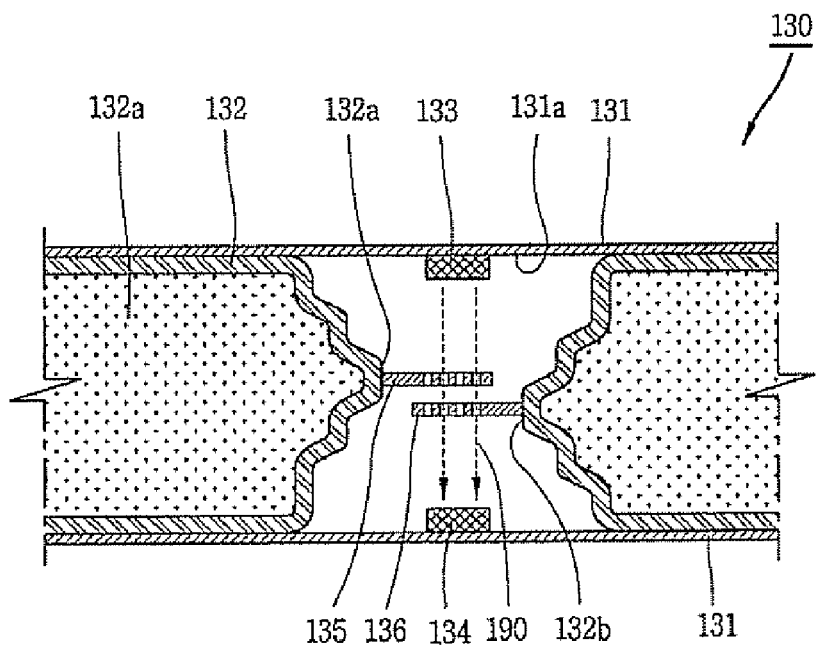
FIG. 5 is a sectional view taken along line B-B of the bumper device in FIG. 4 without having an impact applied thereto.
Figure 6:
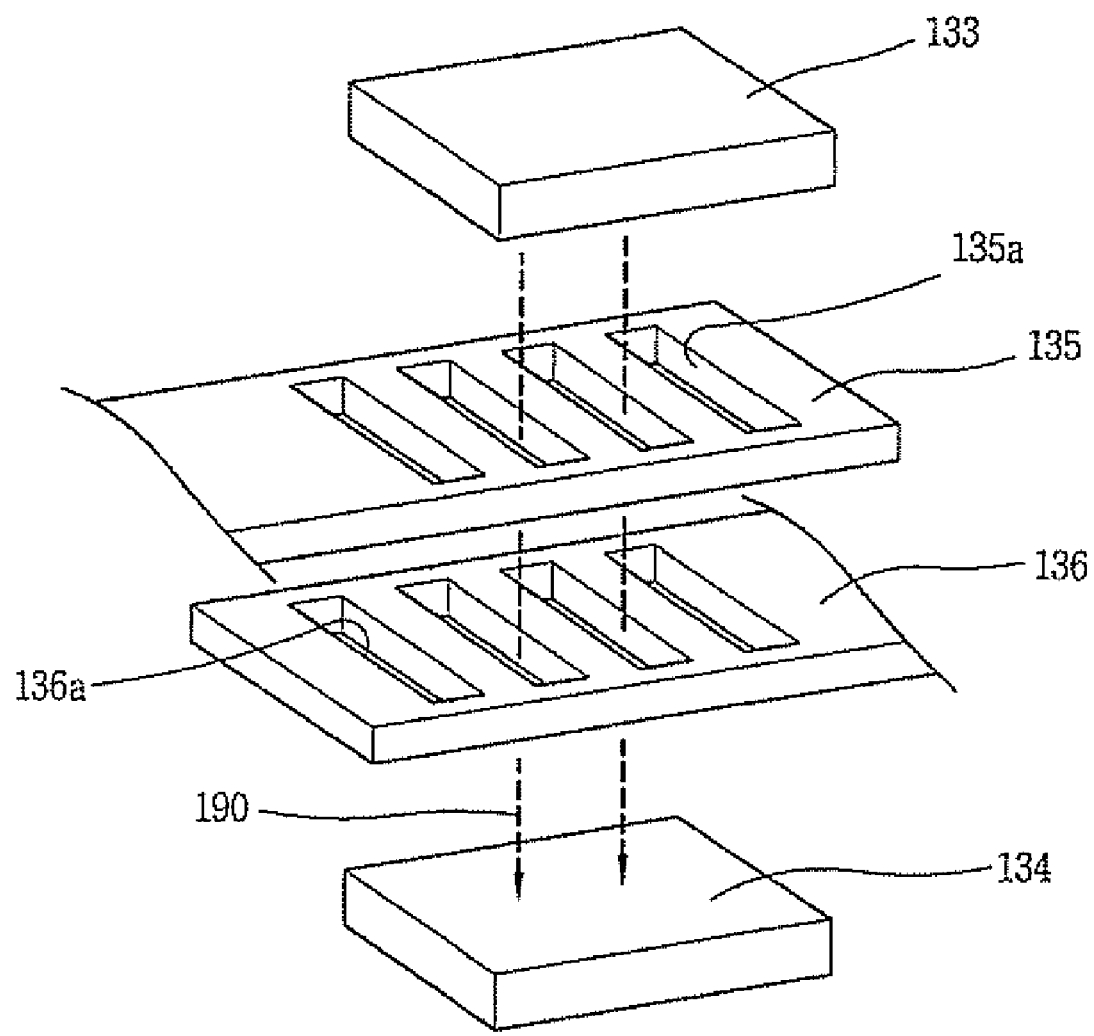
FIG. 6 shows a sensing unit without having an impact applied to the bumper device.
Figure 7:
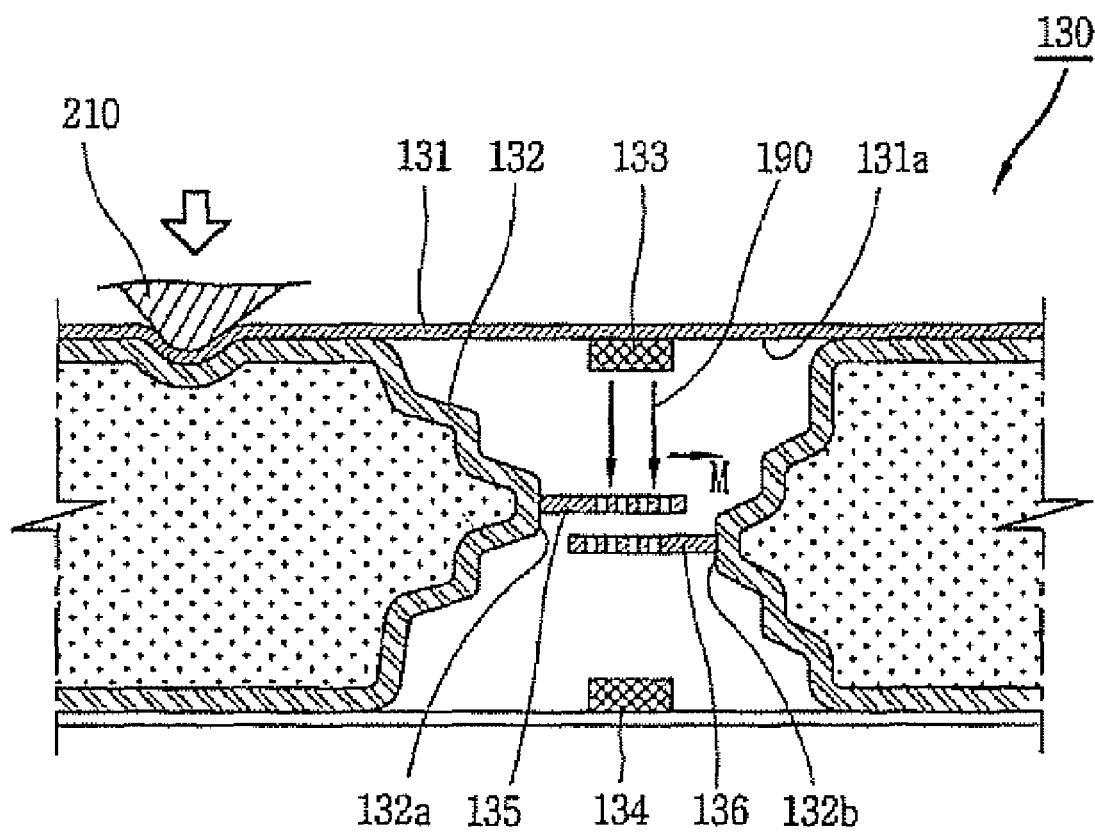
FIG. 7 is a sectional view taken along line B-B in a state that an impact has been applied to the bumper device in FIG. 4.
Figure 8:
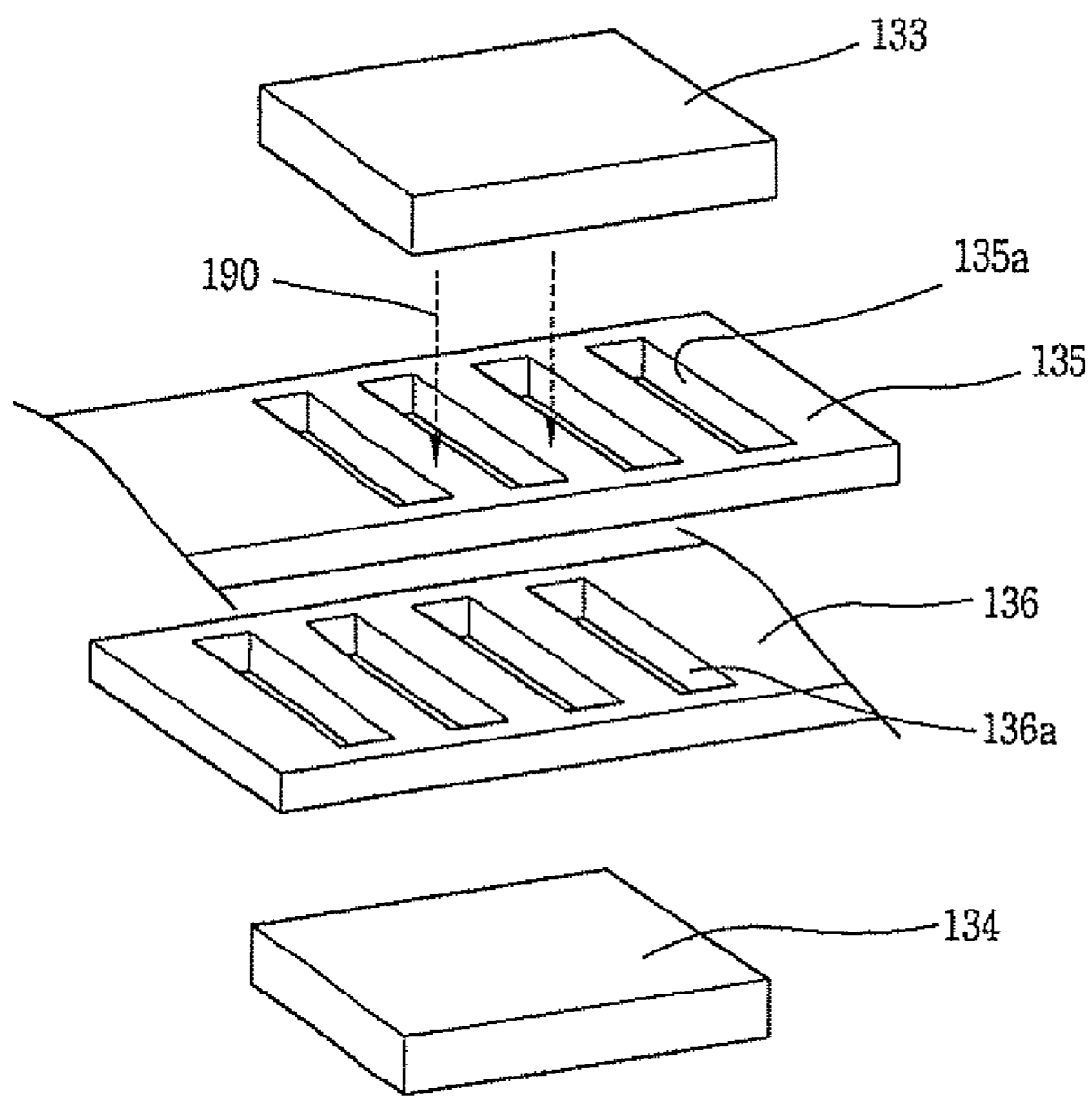
FIG. 8 shows the sensing unit in the state that an impact has been applied to the bumper device of FIG. 7.
Figure 9:
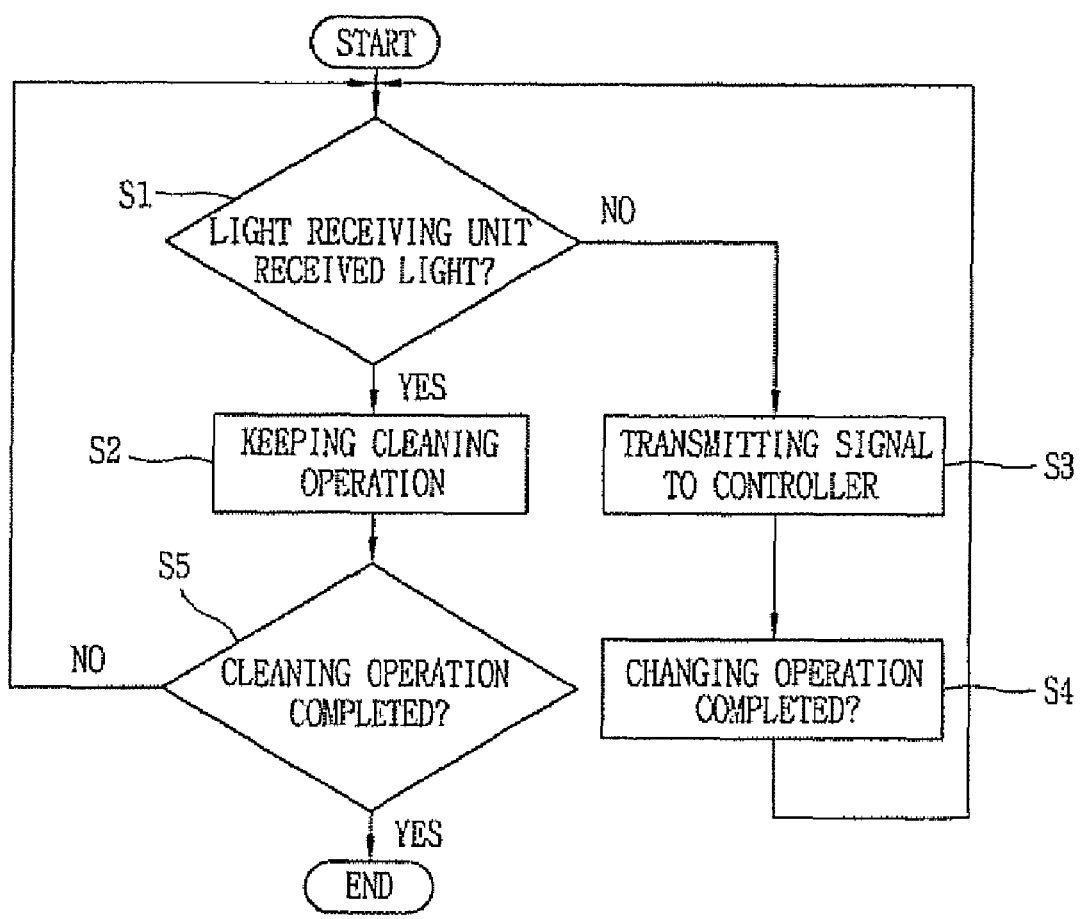
FIG. 9 is a flow chart illustrating the processes of a cleaning operation of the robot cleaner in FIG. 4.

FIG. 4 is a perspective view of a robot cleaner having a bumper device according to an exemplary embodiment of the present invention, FIG. 5 is a sectional view taken along line B-B of the bumper device in FIG. 4 without having an impact applied thereto, FIG. 6 shows a sensing unit without having an impact applied to the bumper device, FIG. 7 is a sectional view taken along line B-B in a state that an impact has been applied to the bumper device in FIG. 4, FIG. 8 shows the sensing unit in the state that an impact has been applied to the bumper device of FIG. 7, and FIG. 9 is a flow chart illustrating the processes of a cleaning operation of the robot cleaner in FIG. 4.

With reference to FIG. 4, a robot cleaner 100 having a bumper device 130 includes a main body 110 having a suction opening (not shown) for sucking dust or debris from a floor of a room, etc., a driving wheel 120 installed at a lower portion of the main body 110 of the robot cleaner and allowing the robot cleaner to travel, and the bumper device 130 having a tube shape and covering an outer side of the main body 110 to buffer an impact.

With reference to FIGS. 5 and 7, the buffer device 130 includes a bumper housing 131 formed of fabric made of a material for restraining expansion and forming the exterior of the bumper device 130; an air tube 132 made of a rubber material, a viscoelastic material, so as to be expandable along an internal passage 131a of the bumper housing 131; a light emitting unit 133 attached on an upper surface of an inner side of the bumper housing 131 and emitting light; a light receiving unit 134 attached on a lower source of the inner side of the bumper housing 131 and receiving light; and a sensing unit including first and second operational pieces 135 and 136 respectively attached at one end 132 and the other end 132b of the air tube 132 and moving to make interference between the light emitting unit 133 and the light receiving unit 134 by interworking with expansion of the air tube 132. In this case, the light emitting unit 133 and the light receiving unit 134 can be replaced any type of sensor such as an ultrasonic sensor so long as it can sense a change in the positions of the operational pieces 135 and 136.

With reference to FIGS. 6 and 8, a plurality of slits 135a are formed at the first operational piece 135, and a plurality of slits 136a are also formed at the second operational piece 136 corresponding to the slits 135a of the first operational piece 135. Herein, the slits 135a and 136a can have any shape such as a circular shape or a triangular shape so long as they can allow light emitted from the light emitting unit 133 to penetrate therethrough to reach the light receiving unit 134. The fist and second operational pieces 135 and 136, each having the slits 135a and 136b, are installed to face in a folded manner.

The operation of the bumper device 130 of the robot cleaner 100 will be described in detail with reference to FIGS. 4 to 9.

When the robot cleaner 100 is turned on, it travels in a cleaning region according to rotation of the driving wheel 120, sucking dust or debris from the floor of a room, etc. through the suction opening (not shown) by virtue of a suction force of a fan motor (not shown) so as to be collected into a filter (not shown).

If no impact is applied to the robot cleaner 100, as shown in FIGS. 5 and 6, light 190 emitted from the light emitting unit 133 penetrates through the slits 135a and 136a of the first and second operational pieces 135 and 136 and is made incident to the light receiving unit 134 (step S1), during which the light receiving unit does not transmit any signal to a controller (not shown). Accordingly, with no impact applied thereto, the robot cleaner 100 keeps cleaning (step S2).

If, however, an external impact is applied to the robot cleaner 100 as an arbitrary point of the bumper device 130 of the robot cleaner 100 collides with an obstacle 210, as shown in FIGS. 7 and 8, the bumper device 130 surrounding the outer surface of the main body 110 of the robot cleaner 100 absorbs the impact to lessen it in its transfer to the robot cleaner 100.

Also, at the moment the impact is generated as the robot cleaner 100 collides with the obstacle 210, the air tube 132 is dented inwardly. Then, pressure inside 132a of the air tube 132 increases instantly to make other portion of the air tube 132 expanded.

In this case, however, because the bumper housing 131 surrounding the air tube 132 is made of fabric that restrains expansion, the air tube 132 is is interfered to be expanded in a radial direction.

Accordingly, the air tube expands only along the internal passage 131a of the bumper housing 131.

And at this time, the first and second operational pieces 135 and 136 attached at one end 132 and the other end 132b of the air tube 132 make a relative movement in a direction that they become close. Namely, as shown in FIG. 7, the first operational piece 135 attached at one end 132a of the air tube 132 moves in a direction of an arrow 'M' so as to be close to the second operational piece 136.

Then, the slits 135a and 136a formed at the respective operational pieces 135 and 136 cross to prevent transfer of light 190 emitted from the light emitting unit 133 to the light receiving unit 134. Accordingly, light cannot reach the light receiving unit 134 and the light receiving unit 134, to which light is not transferred, sends a signal to the controller (not shown) (step S3).

Upon receiving the signal, the controller changes suitably a cleaning operation by instructing to stop the robot cleaner 100 or change a traveling direction of the robot cleaner 100 (step S4).

While the robot cleaner 100 performs the cleaning operation without a collision with an obstacle, light 190 is continuously transferred to the light receiving unit 134, so the robot cleaner 100 keeps cleaning without being interrupted, and when a pre-set cleaning region is entirely cleaned, the robot cleaner stops the cleaning operation (step S5).

As so far described, the robot cleaner having the bumper device in accordance with the present invention has many advantages.

That is, for example, first, even if an impact is applied to any position of front, side and rear surfaces of the main body, it can be lessened in its transfer to the robot cleaner.

Second, an external impact applied to the robot cleaner during a cleaning operation is sensed and a traveling direction of the robot cleaner is changed toward a place where there is no obstacle. Thus, a cleaning operation in a complicate area can be effectively performed by suitably changing the cleaning operation.

Third, compared with the related art bumper device, the bumper device of the present invention has a simple construction, so it can occupy a smaller space and its weight can be reduced.

Fourth, compared with the related art bumper device, the bumper device of the present invention can have excellent effect at a relatively low cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A robot cleaner comprising:
    a main body;
    a driving wheel installed at a lower portion of the main body and enabling the robot cleaner to travel; and
    a bumper housing coupled to cover an outer circumferential surface of the main body of the robot cleaner, the bumper housing being made of a material that restrains an expansion, and having an internal passage;
    an air tube insertedly installed in the bumper housing so as to be expandable along the internal passage; and
    a sensor comprising a light emitter that emits light, a light receiver that receives light emitted from the light emitter, a first operational piece that moves to cause an interference between the light emitter and the light receiver by interworking with expansion of the air tube and attached at one end of the air tube, and a second operational piece that moves to cause an interference between the light emitter and the light receiver by interworking with expansion of the air tube and attached at the other end of the air tube.

2. The cleaner of claim 1, wherein the first and second operational pieces comprise slits allowing light emitted from the light emitter to pass therethrough toward the light receiver, and are installed in a folded manner.

3. The cleaner of claim 1, wherein the bumper housing is made of a fabric material.

4. The device of claim 1, wherein the air tube is made of a viscoelastic material.

* * * * *